Patented Oct. 9, 1923.

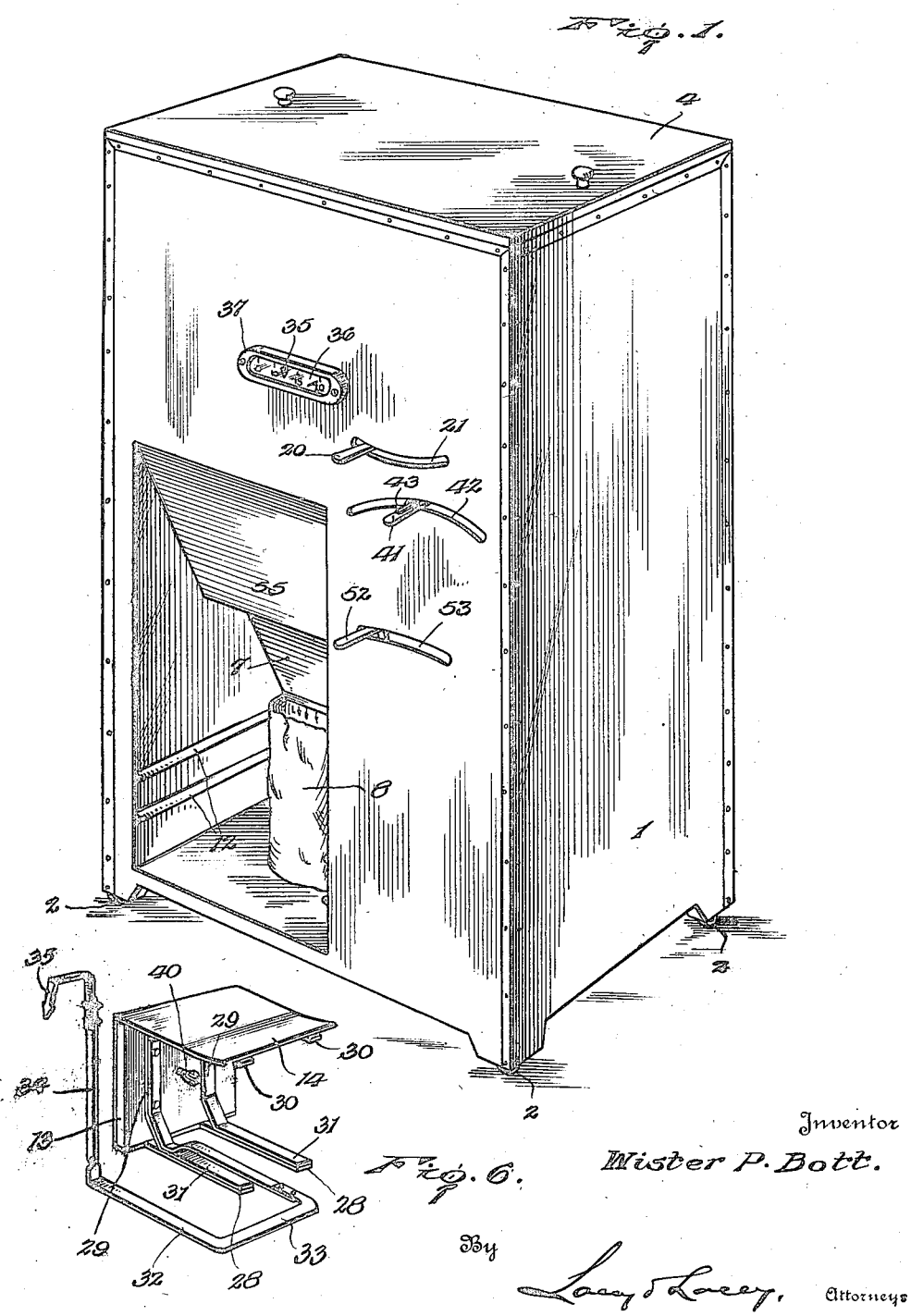

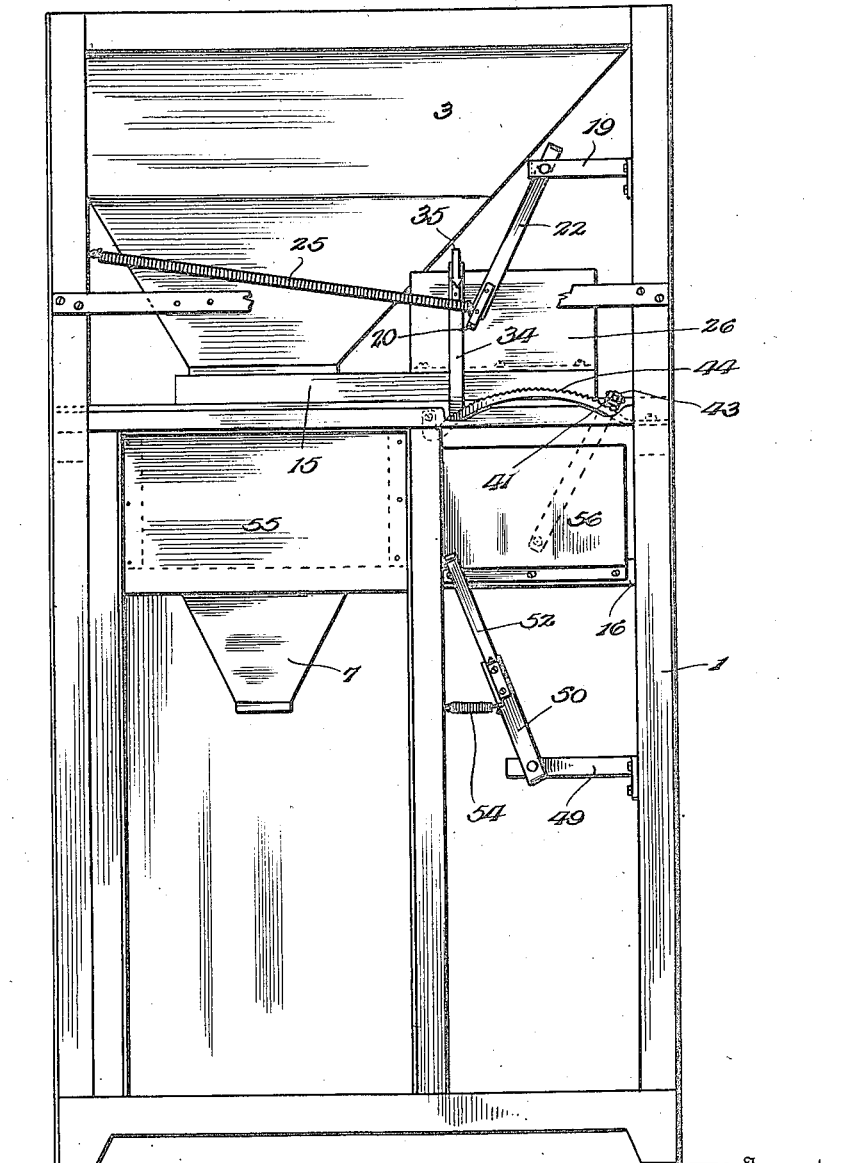

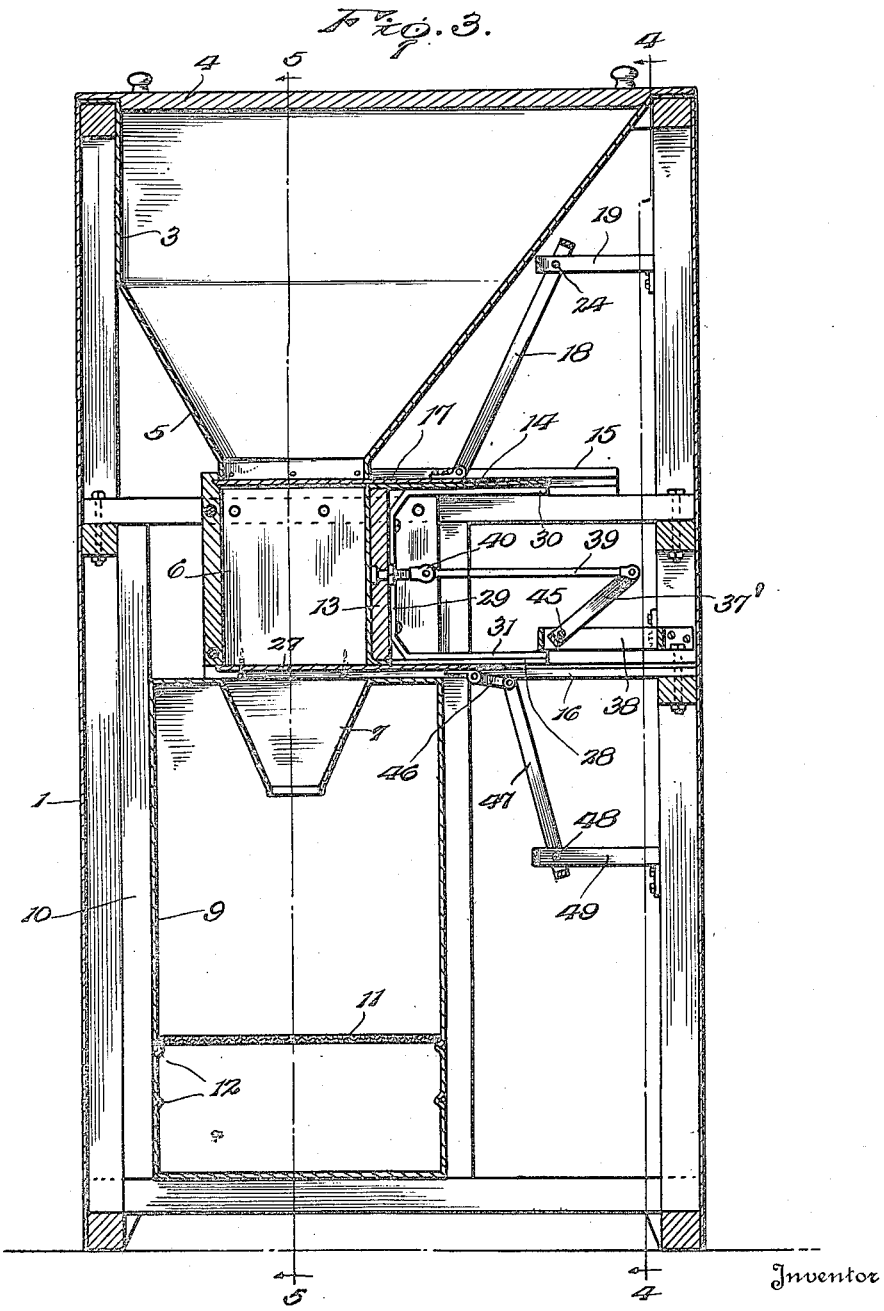

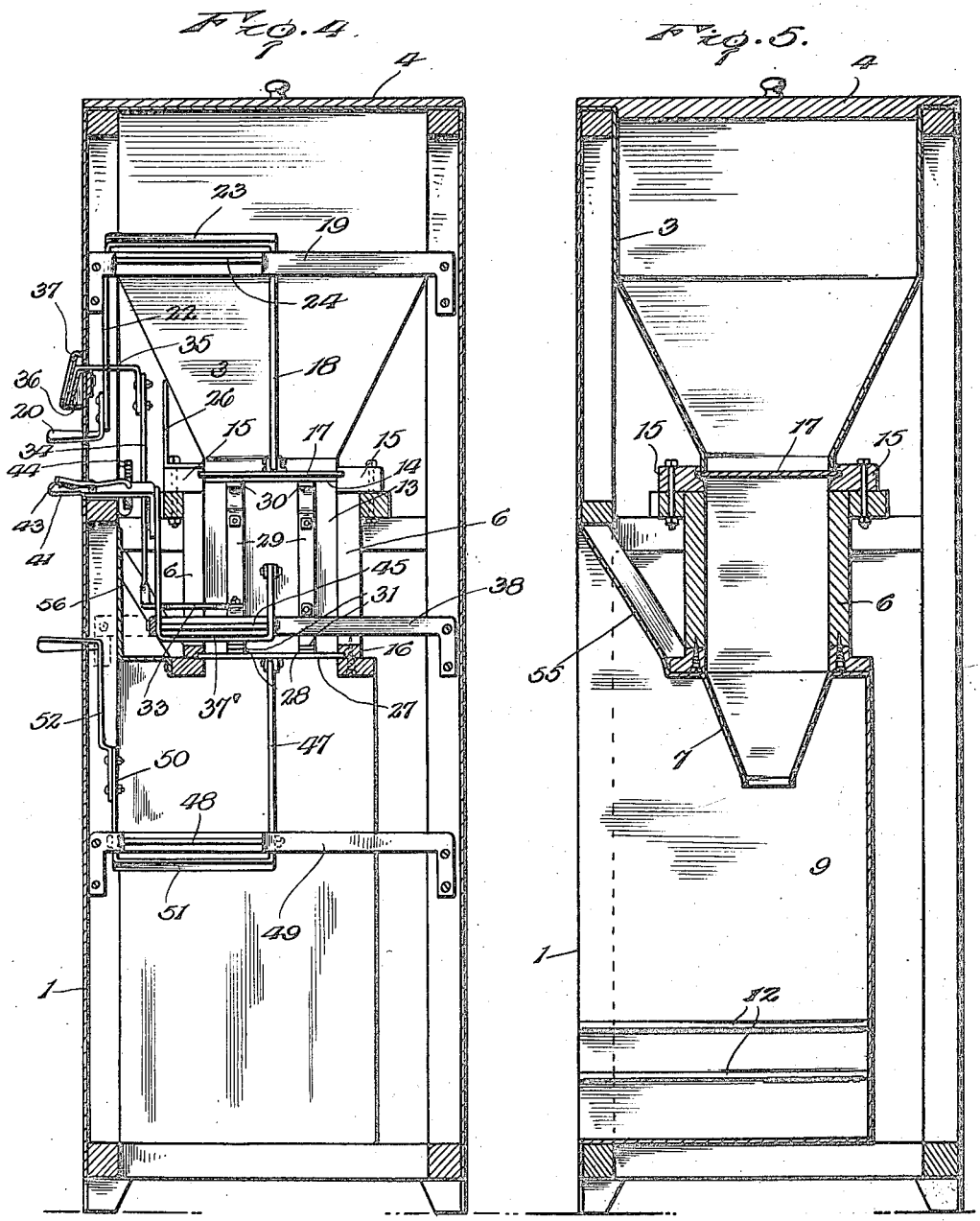

1,469,879

UNITED STATES PATENT OFFICE.

WISTER P. BOTT, OF BERNICE, LOUISIANA.

DISPENSING APPARATUS.

Application filed March 21, 1922. Serial No. 545,413.

*To all whom it may concern:*

Be it known that I, WISTER P. BOTT, a citizen of the United States, residing at Bernice, in the parish of Union and State of Louisiana, have invented certain new and useful Improvements in Dispensing Apparatus, of which the following is a specification.

The object of my invention is to provide a simple and compact mechanism whereby flour, sugar, salt or other powdered or granular material may be dispensed in measured quantities with a minimum effort upon the part of the salesman. The invention seeks to provide a dispensing apparatus which may be readily set to measure any desired quantity of the material and easily operated to deliver the measured quantity of material as may be needed. Other objects of the invention will appear incidentally in the course of the following description, and the invention resides in certain novel features which will be particularly pointed out in the claims following the description.

In the accompanying drawings which illustrate one embodiment of the invention—

Figure 1 is a perspective view of the complete machine;

Fig. 2 is a front elevation of the same with the front wall of the casing removed and a part broken away;

Fig. 3 is a central vertical longitudinal section;

Fig. 4 is a transverse section on the line 4—4 of Fig. 3;

Fig. 5 is a similar view on the line 5—5 of Fig. 3;

Fig. 6 is a detail perspective view of the measuring plunger and the pointer connected therewith.

In carrying out my invention, I employ a suitable supporting frame which is preferably housed within a casing 1 and may be mounted upon casters 2 so as to be readily moved from place to place or set at a most convenient point in a store room. In the upper end of the casing, a hopper or bin 3 is supported upon the frame and this hopper or bin is equipped with a removable cover 4 so that the commodity to be dispensed may be readily placed in the bin or hopper and then covered so as to be protected from dust or other impurities. The hopper or bin has its side walls converging downwardly, as indicated at 5, and its lower end is open and fitted within a three-sided tube or measuring compartment 6, said measuring compartment having both its top and bottom open and having its bottom disposed immediately over a funnel 7 through which the material is discharged into a sack or other receptacle 8 supported below the funnel, as shown in Fig. 1. The funnel is arranged in the upper end of a compartment 9 which is fixed within the supporting frame, indicated at 10, and the sack or other receptacle may rest directly upon the bottom of said compartment or may be supported upon a removable shelf 11 which is adapted to rest upon beads or other supports 12 provided on the walls of the said compartment. The shelf 11 obviously may be set at a lower or higher point in the compartment 9 so as to accommodate sacks or receptacles of various capacities according to the quantity of the commodity which is to be delivered. Within the open side of the measuring tube or spout 6 is slidably mounted a plunger or cut-off consisting of a vertically disposed plate or wall 13 and a horizontal cover plate 14 extending laterally from the upper edge of said plate or wall. Extending laterally from the open side of the measuring spout at the upper and lower ends thereof are guides 15 and 16 and in the upper guides 15 is slidably mounted a cut-off plate or valve 17 which is adapted to extend across the bottom of the bin or hopper 3 and close the same to the measuring spout, as shown in Fig. 3. The plate 14 is resilient so that it will bear closely against the under side of the cut-off slide 17 and thereby prevent the leakage of the material between the opposed faces of the cut-off or valve 17 and the plate 14, as will be readily understood. The valve 17 is operated through the manipulation of a link or lever 18 which is pivoted at its lower end upon the valve and has its upper end pivotally supported by a bracket 19 secured upon the frame of the machine and of any convenient or preferred form. An operating handle 20 is connected with the link or lever 18 and projects through a slot 21 in the front wall of the casing, as clearly shown in Fig. 1. In the present embodiment of the invention, the handle 20 is carried by the lower end of an operating arm 22 which is connected by a cross bar 23 with the upper end of the lever or rocking link 18, the said members 22, 23 and 18 forming an inverted bail and the members 22 and 18 of said bail being pivotally mounted upon a pin or rod 24 fixed in the bracket 19. A coiled spring 25 is attached at one end to the rocking arm 22 and at its opposite end to the supporting frame, as clearly shown in Fig. 2, the spring being disposed between the front wall of the hopper 3 and the front wall of the casing 2 and normally holding the parts in such position that the valve 17 will extend across the bottom of the hopper, as shown in Fig. 3. A shield 26 of any convenient form is secured upon the front guide 15 and rises therefrom back of the rocking arm 22 so as to prevent access to the valve or the lever 18 through the slot 21 and also to hide the lever and the valve from the view of persons standing in front of the apparatus. A cut-off plate or valve 27 is slidably mounted in the guides 16 and is adapted to extend across the lower end of the measuring spout 6 and cut off the flow through the spout, except when it may be withdrawn by the salesman.

The plunger 13 fits closely between the two valves or cut-offs 17 and 27 and from the lower edge of the plunger, guide arms 28 extend laterally outward. To the outer side of the plunger, I secure brackets 29 which have laterally projecting arms 30 extending from their upper ends immediately below the cover plate 14 so as to support the said plate and hold it against the upper valve or cut-off plate 17. From the lower ends of the brackets 29, arms 31 extend laterally outward and said arms bear upon the arms 28 projecting from the lower edge of the plunger, the arms 28 and 31 serving to prevent buckling of the lower valve or cut-off plate 27 and also serving as guides for the plunger to prevent twisting movement of the same during its operation. To one of the brackets 29, I secure a frame 32 which extends laterally outward and then forwardly, as shown at 33, to a point near the front wall of the casing, thence extending inwardly parallel with the front wall of the casing to a point approximately in the vertical plane of the plunger. From this point, the frame 32 rises vertically, as shown at 34, and to the upper end of said vertical portion is secured a pointer or index finger 35 which projects forwardly through a suitable slot in the front wall of the casing and plays over a dial or scale 36 which is covered by a glazed hood 37 so that the reading of the scale and the position of the index finger may be easily noted. The hood 37 may be of any convenient or preferred form and is removably secured upon the front wall of the casing so as to enclose the scale or dial but is spaced from the dial, as shown in Fig. 4, so that the pointer or index finger may move easily in setting the plunger. It will be readily noted that the index finger is fixed relative to the plunger so that the movement of the plunger will be transmitted to the index finger and accuracy in the setting of the plunger thereby attained. The plunger is moved outwardly or inwardly across the measuring spout 6 accordingly as a greater or less quantity of the material is to be dispensed, and the position of the plunger will be accurately indicated by the position of the index finger relative to the dial or scale 36. The graduations of the scale or dial represent pounds and fractions of a pound and, of course, a plurality of dials will be provided so that the machine may be equipped with a dial conforming accurately to the ratio between weight and volume in the particular commodity which is to be dispensed. To operate the plunger, I provide a bail 37' pivotally mounted upon a bracket 38 of any convenient or preferred form, the inner arm of the bail being pivoted to the outer end of a connecting rod or link 39 which has its inner end pivotally attached to a lug 40 on the plunger. The outer arm of the bail 37' carries a handle 41 which extends through a slot 42 in the front wall of the casing and is equipped with a dog 43 adapted to engage a rack 44 which is fixed upon the supporting frame within the casing and describes an arc concentric with the pivot 45 of the bail. When the plunger has reached the proper point, as shown by the indicator 35, the dog 43 is permitted to engage the rack 44 and thereby hold the plunger in its set position.

To the under side of the lower valve or cut-off plate 27, I pivot a link 46 which is in turn pivoted to the upper end of a lever or rocking arm 47 pivotally supported upon a pin or rod 48 carried by a bracket 49 so that when this lever 47 is rocked, the cut-off plate will be moved inwardly or outwardly to prevent or permit flow through the measuring spout. The lever 47 preferably forms the inner arm of a bail which is completed by an outer rocking arm 50 and a cross bar 51 connecting the lower ends of the lever 47 and the said arm 50. The rocking arm 50 carries a handle 52, the end of which projects through a slot 53 in the front wall of the casing, and a spring 54 attached to the said arm and to the supporting frame holds the parts normally in such position that the valve or cut-off plate 27 will extend across the lower end of the measuring spout, as shown in Fig. 3.

It is thought the operation of my improved apparatus will be readily understood from the foregoing description, taken in connection with the accompanying drawings. Normally, the measuring spout 6 is empty and its upper and lower ends are closed by the respective valves or cut-off plates 17 and 27. When a sale is to be made, the handle 41 is moved toward one or the other side of the casing, the dog 43 being released from and held out of engagement with the rack 44, as will be readily understood. When the index finger or pointer 35 registers with the marking of the scale 36 which indicates the desired quantity of the commodity, the dog 43 is released and will then immediately engage the rack 44 and hold the plunger in the position in which it has been set during the subsequent manipulation of the valves. The handle 20 is then swung toward the adjacent side of the casing and the lever 18 will, consequently, be rocked so as to withdraw the valve 17 from its closing position, the material in the bin then flowing through the lower end thereof into the space defined by the measuring spout 6 and the plunger 13. The flow of the material will start immediately upon the edge of the valve clearing the far side of the hopper or bin exit, and will continue with increasing volume as the opening movement of the valve progresses so that by the time the valve is fully opened, the available space in the measuring spout will be completely filled and the handle 20 may be released to permit the spring 25 to return the valve to its closed position. The handle 52 is then moved toward the adjacent side of the casing so that the cut-off plate or valve 27 will be moved to open position and the quantity of the commodity which may have flowed into the measuring spout will then pass through the funnel 7 into the receptacle placed below the same. When the handle 52 is released, the spring 54 will at once return the lower valve to its closed position so that the parts will be in position to be properly manipulated for a subsequent sale.

To impart a neat finish to the casing, an inclined plate 55 is preferably secured upon the frame and extends from the top of the compartment 9 to the lower end of the measuring spout and to prevent tampering from the outside of the casing, with the plunger setting mechanism, I provide a shield or guard plate 56 which rises from the lower guides 16 past the slot 53 so that none of the mechanism may be seen through the said slot.

It will be readily noted that all the parts of my apparatus are housed within the casing 2, and the construction and arrangement are such that the operating mechanism is separated from the parts through which the commodity flows in its passage to the receptable 8 so that the possibility of the operating parts becoming clogged with dust from the commodity is minimized. All the elements of the apparatus are simple in form and may be easily manipulated and are not apt to get out of order.

Having thus described the invention, what is claimed as new is:

1. A dispensing apparatus comprising a storage compartment, a delivery compartment below the storage compartment, a measuring spout interposed between the storage compartment and the delivery compartment, slidable cut-offs mounted in the upper and lower ends of the spout, and a plunger fitting closely between the said cut-offs and movable across the spout, the plunger being provided at its upper edge with a resilient cover plate projecting outwardly therefrom and bearing closely against the under side of the upper cut-off.

2. A dispensing apparatus comprising a storage compartment, a delivery compartment below the storage compartment, a measuring spout interposed between the storage compartment and the delivery compartment, cut-offs in the upper and lower ends of the spout to control the flow therethrough, a plunger fitting closely between said cut-offs and movable across the spout, a dial, and a pointer movable over said dial and rigidly connected with the plunger to move with and in the same direction as the plunger.

3. In a dispensing apparatus, the combination of a supporting frame, a casing enclosing said frame, a storage compartment within the upper portion of the casing, a delivery compartment within the casing below the storage compartment, a measuring spout interposed between the storage compartment and the delivery compartment, slidable cut-offs movable in rectilinear paths across the upper and lower ends of the spout to control the flow therethrough, a dial on the casing, a pointer rigidly connected with the plunger and movable over said dial, and means for setting the plunger.

4. In a dispensing apparatus, the combination of a casing, a storage compartment in the upper portion of the casing, a delivery compartment below the storage compartment, a measuring spout interposed between the storage compartment and the delivery compartment, cut-offs movable across the upper and lower ends of the spout, a plunger fitting closely between said cut-offs, an index connected with the plunger in fixed relation thereto, a rocking arm operatively connected with the plunger, a rack fixed within the casing and disposed concentric with the pivot of said rocking arm, and a dog carried by said rocking arm and adapted to engage said rack whereby to hold the plunger in a set position, the dog and the end of the rocking arm projecting through the casing to be operated from the exterior thereof.

5. In a dispensing apparatus, the combination of a casing, a storage compartment in the upper portion of the casing, a delivery compartment below the storage compartment, a measuring spout interposed between the storage compartment and the delivery compartment, slidable cut-off plates movable across the upper and lower ends of the spout, a plunger slidably fitted between the said cut-off plates and movable across the spout, a resilient cover plate extending outwardly from the upper edge of the plunger to bear against the under side of the upper cut-off plate, arms projecting laterally from the lower edge of the plunger and bearing upon the lower cut-off plate, brackets secured to the plunger and having arms extending laterally outwardly therefrom to bear against the said cover plate and the first-mentioned arms respectively, means for setting the plunger in a predetermined position, and an index connected with the plunger in a fixed relation thereto.

6. In a dispensing apparatus, the combination of a casing, a storage compartment in the upper portion of the casing, a delivery compartment below the storage compartment, a measuring spout interposed between the storage compartment and the delivery compartment, a plunger movable across the spout, means for setting the plunger in a predetermined position, cut-off plates slidably mounted in the upper and lower ends of the spout, rocking arms connected with the respective cut-off plates, means for actuating said rocking arms, yieldable means connected with said rocking arms for normally holding the cut-off plates in closed position, and shields within the casing between the front of the same and the the cut-off plates.

In testimony whereof I affix my signature.

WISTER P. BOTT. [L. S.]